United States Patent [19]

Inui et al.

[11] Patent Number: 5,363,125
[45] Date of Patent: Nov. 8, 1994

[54] METHOD AND DEVICE FOR CORRECTING SHADING IN THERMAL PRINTER

[75] Inventors: Fuyuki Inui; Hitoshi Saito, both of Tokyo, Japan

[73] Assignee: Fuji Photo Film Co., Ltd., Kanagawa, Japan

[21] Appl. No.: 882,017

[22] Filed: May 13, 1992

[30] Foreign Application Priority Data

May 13, 1991 [JP] Japan .................... 3-137180

[51] Int. Cl.$^5$ .................................. B41J 2/35
[52] U.S. Cl. .................................. 346/76 PH; 358/298
[58] Field of Search .................... 346/1.1, 76 PH; 358/298

[56] References Cited

U.S. PATENT DOCUMENTS

| | | | |
|---|---|---|---|
| 4,724,446 | 2/1988 | Hirahara et al. | 346/76 PH |
| 4,821,111 | 4/1989 | Nowell | 346/76 PH |
| 4,843,408 | 6/1989 | Tanaka | 346/76 PH |
| 4,890,121 | 12/1989 | Hirahara et al. | 346/76 PH |

FOREIGN PATENT DOCUMENTS

0219969  9/1991  Japan .

Primary Examiner—Benjamin R. Fuller
Assistant Examiner—Huan Tran

[57] ABSTRACT

A thermal recording method and device for recording a half-tone image on a recording sheet, wherein each pixel includes a plurality of sub-lines, and a half-tone is produced by changing the number of the sub-lines where ink is recorded. According to a desirable tonal step, a number of drive pulses are applied to a thermal element for each pixel while the thermal element moves in a sub scan direction relative to the recording sheet, with one drive pulse corresponding to one sub-line. The width of the drive pulse corresponding to the first sub-line of each pixel is set longer than the other drive pulses for the following sub-lines, and is changed according to the pixel position in the sub scan direction. The width of the drive pulse for the first sub-line is the longest at the beginning of recording, and becomes shorter as the recording proceeds. The widths of the other drive pulses may be changed according to the sub-line position within each pixel.

19 Claims, 6 Drawing Sheets

METHOD AND DEVICE FOR CORRECTING SHADING IN THERMAL PRINTER

BACKGROUND OF THE INVENTION

1. Field of the Invention

The present invention relates to a thermal recording device and method for thermal printers, and particularly to an area gradation thermal recording device and method for providing a half-tone of image by changing the recording area of each dot within one pixel. More particularly, the present invention relates to a method and device for compensating the influence of heat energy accumulated in a thermal recording head onto the recording density.

2. Description of the Related Art

Conventionally, there are two types of thermal recording: one type is a direct thermal recording method wherein recording paper is directly heated to record dots on the recording paper, and the other type is a thermal transfer method wherein an ink is transferred from an ink film onto recording paper. The thermal transfer method includes wax transfer type recording wherein melted or softened ink is transferred to the recording paper, and sublimation type recording wherein a dye is sublimated or diffused from the ink film to the recording paper.

In order to provide a half-tone image, an area gradation method has been proposed. According to this method, one pixel is divided into a plurality of sub-lines. Each time a thermal element faces to one sub-line to be recorded, a drive pulse is supplied to the thermal element to be energized to record a dot, wherein the gradation of a pixel, that is, the size of the dot changes according to the number of sub-lines on which the dot is recorded. This area gradation method is effective for a printer which cannot precisely control the density of a dot itself, such as a thermal wax transfer type printer which heats the back of an ink film and transfers melted or softened ink onto a recording sheet.

Printers incorporating such an area gradation method may use a recording head (thermal head) having a plurality of thermal elements arranged in an array. In order to prevent trailing of ink that may be caused by heat energy accumulated in the recording head, various devices have been provided for radiating the accumulated heat energy from the recording head, so that the heated thermal elements are rapidly cooled.

However, if the recording head is very cool prior to the start of recording, it is impossible to record ink at sufficient density on the first sub-line of a pixel by the same drive pulse as used for recording the following sub-lines. In view of this, Fuji Photo Film Co., Ltd. has suggested a method wherein a booster pulse having a large width is applied for rapidly heating up the thermal element to a temperature above which recording is possible, when recording the first sub-line of each pixel (Japanese Patent Application No. 2-15886 corresponding to Japanese Laid-open Patent Application No. 3-219969). However, this method has a problem in that a so-called shading effect may be caused by heat energy accumulated in the recording head when recording dots continuously at maximum density by continuously driving the same thermal element. Because of the shading, the density of the dots undesirably changes as the recording proceeds and the density of the latter dots exceeds a desirable value.

SUMMARY OF THE INVENTION

It is a principal object of the present invention to provide a thermal recording method and device wherein the shading is prevented.

It is another object of the present invention to provide a recording head driving method and device whereby the influence of heat energy accumulated in the recording head is compensated.

In order to achieve the above and other objects, a method of the present invention changes the width of the drive pulse, taking the preceding recording progress of the recording head into consideration.

According to a preferred embodiment, the width of the drive pulse is changed according to the position of a pixel in the sub scan direction and/or the position of a sub-line to be recorded within the pixel.

Because the widths of the drive pulses are changed according to the pixel position and the sub-line position so as to compensate the influence of heat energy accumulated in the recording head, the value of which depends on the preceding recording progress, recording on each sub-line is performed at an approximately constant temperature. Therefore, the shading is prevented.

BRIEF DESCRIPTION OF THE DRAWINGS

The above and other objects and advantages of the present invention will become apparent from the following detailed description of preferred embodiments when read in connection with the accompanying drawings, in which.

DETAILED DESCRIPTION OF THE PREFERRED EMBODIMENTS

Figure 1:
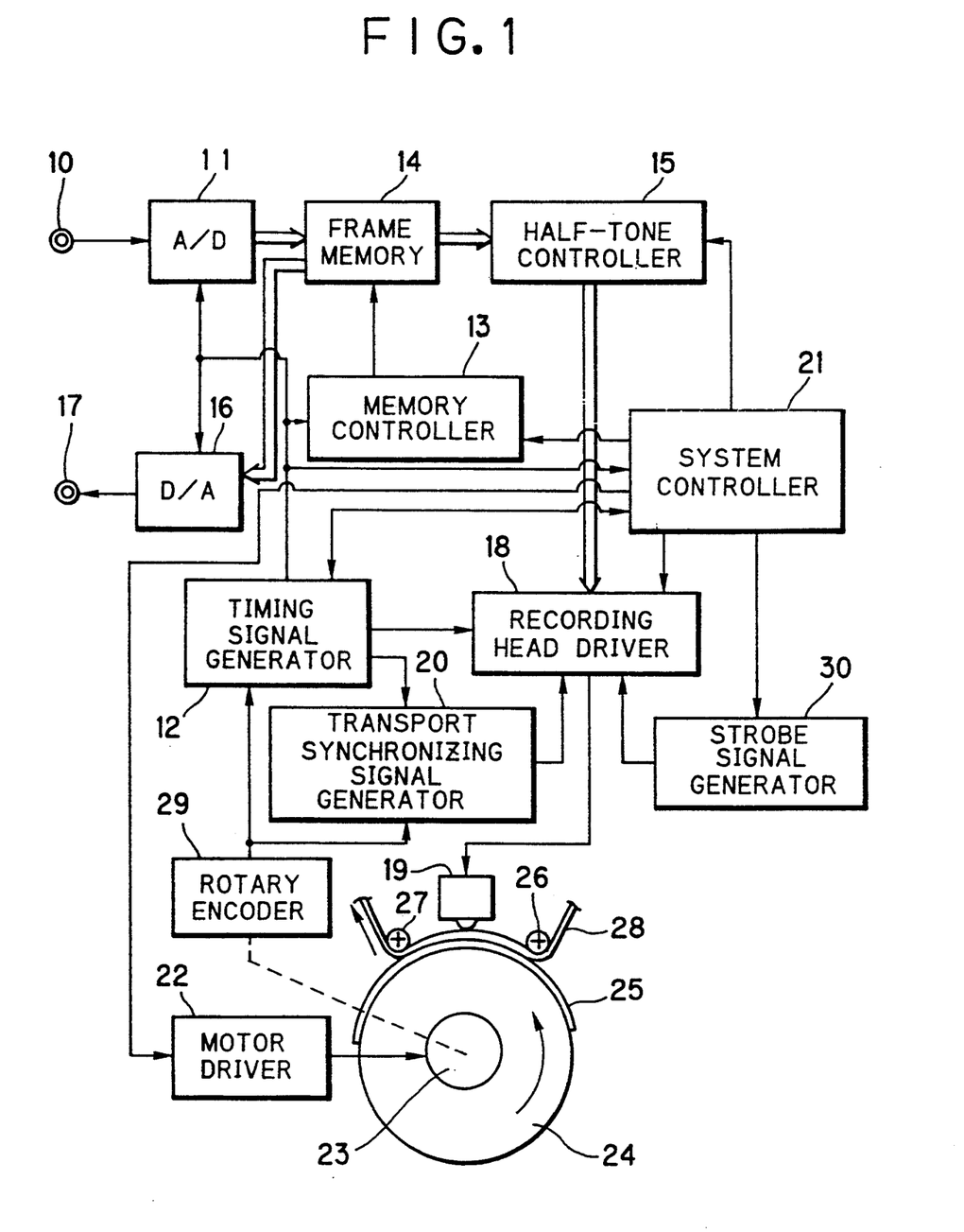
FIG. 1 is a schematic diagram showing a thermal wax transfer type printer.

Referring to FIG. 1, a time sequential image signal is sent to an A/D converter 11 from an input terminal 10, and converted into 8-bit image data representative of tonal steps, synchronously with timings of sampling signals from a timing signal generator 12. In this embodiment, the 8-bit image data are presumed to have five tonal steps, for easy understanding. This 8-bit image data is written in a frame memory 14 controlled by a memory controller 13. The image data is read one line after another from the frame memory 14 and sent to a half-tone controller 15 for printing the image data. The half-tone controller 15 performs gradation correction of the image data of one line including for example, M pixels (M is an optional integer), while taking ink characteristics and the like into consideration. For monitoring the image, the image data read from the frame memory 14 is converted into analog signals by a D/A converter 16 and sent to a monitor (not shown) through an output terminal 17.

Gradation corrected M image data are sent to a recording head driver 18 which controls power conduction of each thermal element of a recording head 19. This recording head driver 18 is supplied with clocks from the timing signal generator 12, transport synchronizing signals from a transport synchronizing signal generator 20, latch signals from a system controller 21, and strobe signals from a strobe signal generator 30.

Figure 2:
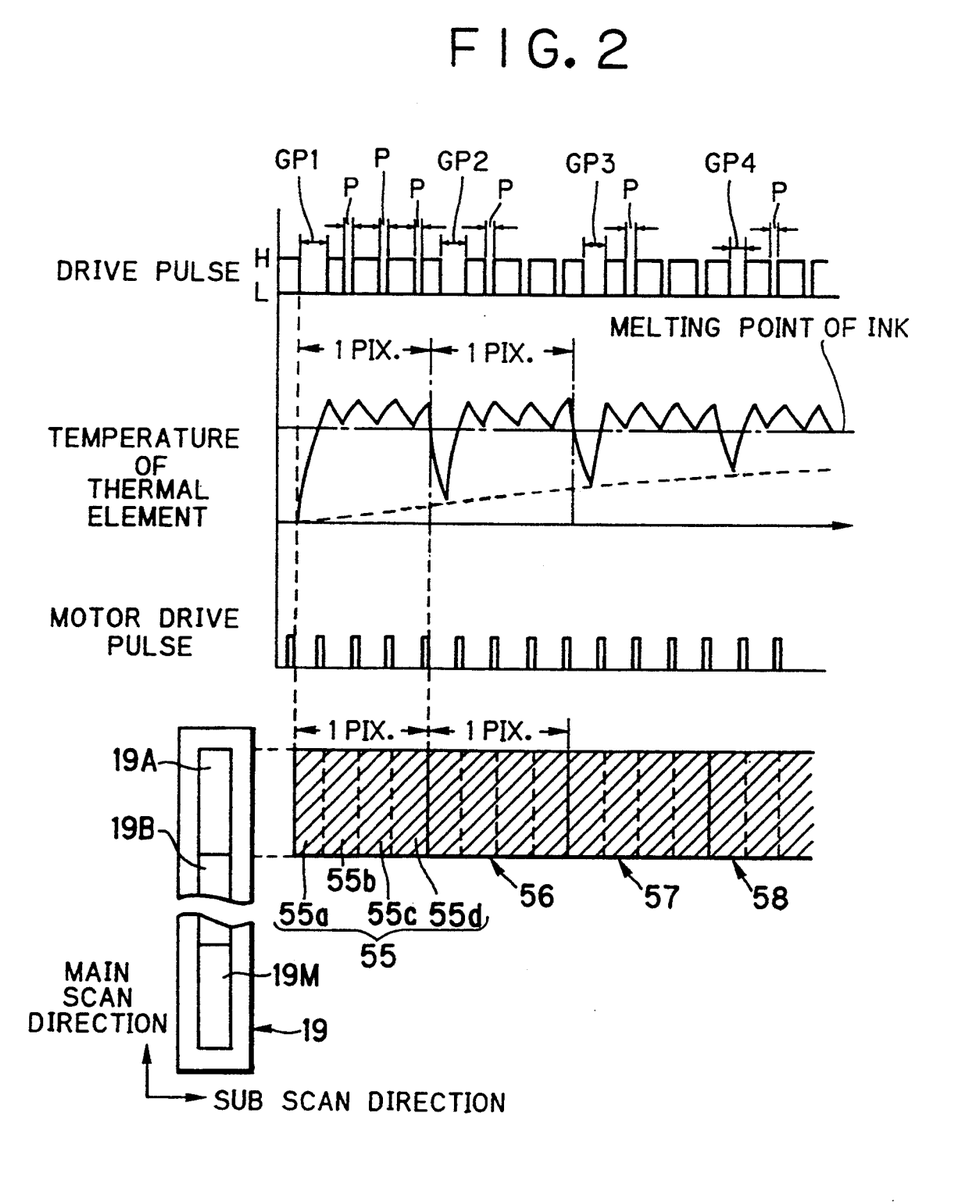
FIG. 2 is a diagram for explaining a thermal recording method according to an embodiment of the present invention.

As shown in FIG. 2, the recording head 19 has M thermal elements 19A to 19M disposed in a main scan direction, each thermal element 19A to 19M being supplied with serial current pulses corresponding in number to the density of each image data. Furthermore, the width of each drive pulse is controlled according to the position of the corresponding pixel and the corresponding sub-line position in the pixel, in order to compensate the influence of heat energy accumulated in the recording head 19. Each thermal element is 125 $\mu$m long in the main scan direction and 20 $\mu$m wide in the sub scan direction. Because the thermal element may burn out in a short time because of heat generated by continuous powering, each thermal element is driven by intermittent current pluses, so as to avoid such burn-out.

Figure 8:
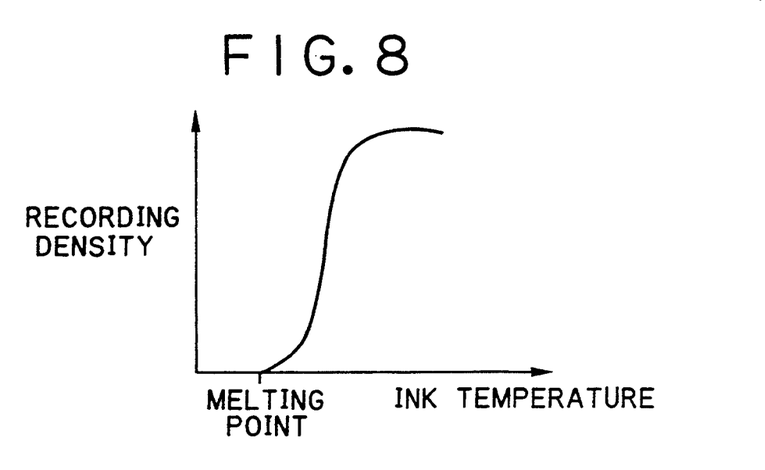
FIG. 8 is a characteristic curve showing a relationship between recording density of an ink film and the ink temperature.

A motor driver 22 supplies motor drive pulses (FIG. 2) to a pulse motor 23, under the control of the system controller 21. The pulse motor 23 rotates a platen drum 24 at a constant pitch, and a recording sheet 25 is wound about the drum 24. An ink film 28, extending between rollers 26 and 27 and in tight contact with the recording sheet 25, moves together with the recording sheet 25, in the sub scan direction indicated by an arrow in FIG. 1. As the back surface of the ink film 28 is heated by the recording head 19, melted or softened ink is transferred onto the recording sheet 25. The ink transfer characteristic of this ink film 28 is shown in FIG. 8.

In this embodiment, in order to provide a 5-step-tonal image, the pulse motor 23 moves 4 steps per pixel, so as to transport the recording sheet 25 by an amount corresponding to the length of each pixel in the sub scan direction. At each step, a drive pulse is supplied to each thermal element. For image data "01h", one drive pulse is supplied to the thermal element to record an ink dot only on the first sub-line of its pixel. For image data "04h", 4 drive pulses are supplied to record a dot on all 4 sub-lines constituting its pixel. As to image data "00h", no current pulse is supplied, so that no ink dot is recorded on any of 4 sub-lines.

The platen drum 24 is coupled to a rotary encoder 29 which generates an encoder pulse each time the platen drum 24 rotates by an amount corresponding to one sub-line. The encoder pulse is supplied to the timing signal generator 12 and the transport synchronizing signal generator 20. Using encoder pulses, the timing signal generator 12 generates timing signals which are sent to the system controller 21. Based on the timing signals, the system controller 21 sequentially controls relevant elements of the printer. The transport synchronizing signal generator 20 generates a transport synchronizing signal each time the encoder pulse is inputted thereto.

Figure 3:
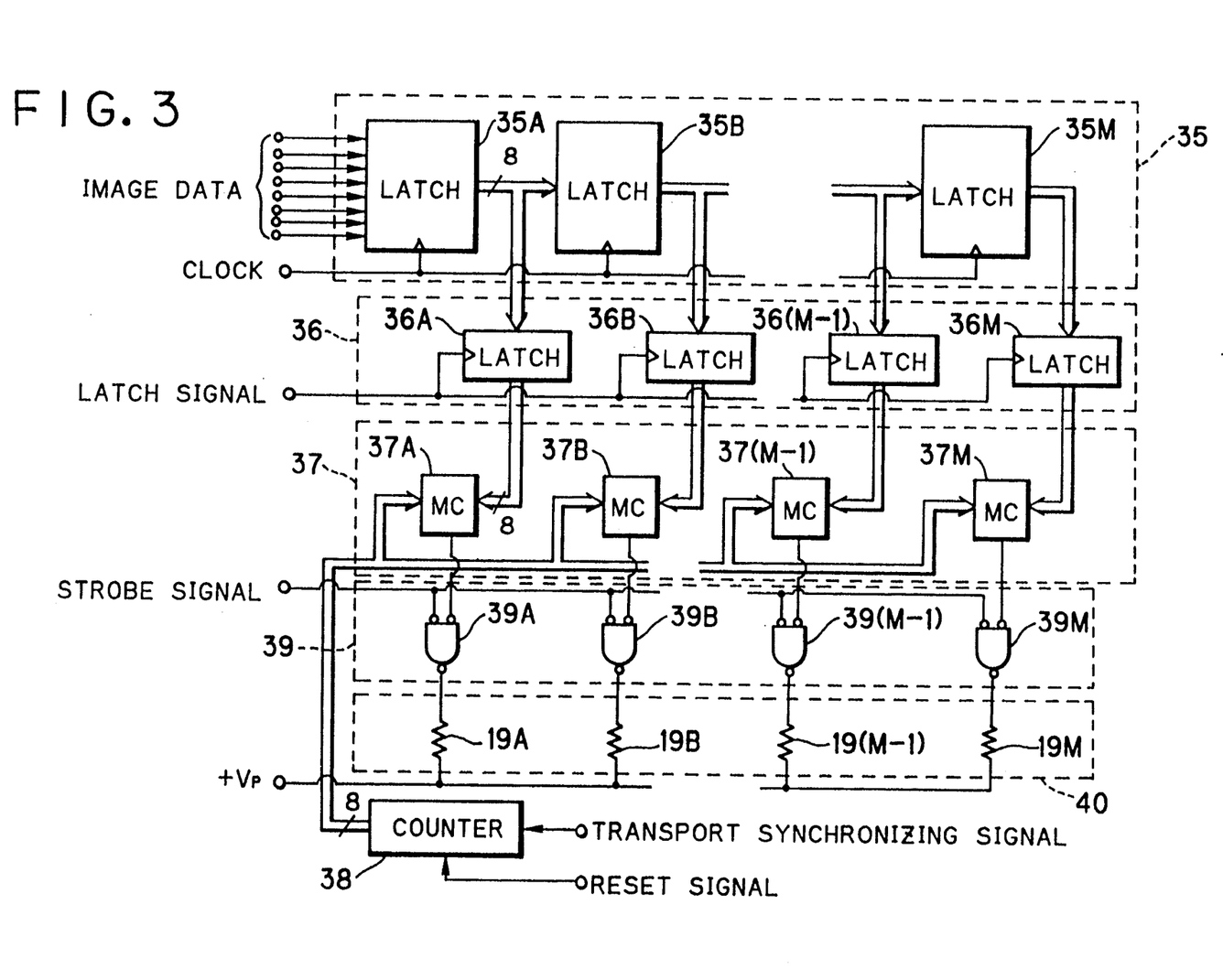
FIG. 3 is a block diagram showing an example of a recording head driver according to an embodiment of the present invention.

FIG. 3 shows the details of the recording head driver 18. A shift register 35 is constructed of serially connected M$\times$8-bit latches 35A to 35M each having eight input terminals and eight output terminals for parallel input/output of 8-bit image data. M image data of one line in the main scan direction are sequentially inputted to the shift register 35, and shifted synchronously with the clocks from the timing signal generator 12, so as to set the image data of one line in the shift register 35.

The shift register 35 is connected to a latch array 36 constructed of M$\times$8-bit latches 36A to 36M for latching respective image data. The M image data converted into parallel M image data by the shift register 35 are latched by the latch array 36 in response to the latch signal from the system controller 21. The latch array 36 is connected to a comparator array 37 constructed of M$\times$8-bit magnitude comparators 37A to 37M each outputting a drive signal of level "L" when the count of a counter 38 is smaller than or equal to each image data.

The counter 38 counts each transport synchronizing signal which is generated every time the recording sheet 25 is moved by one sub-line amount, to thereby identify the position of a present sub-line within each pixel in a hexadecimal notation. With 4 sub-lines of the one pixel 41, the counter 38 is constructed such that it is reset to an initial value "01h" when it receives a transport synchronizing signal at the counted value "04h". The counter 38 is also reset to "01h" in response to a reset signal from the system controller 21, simultaneously with the rising edge of each latch signal.

Output terminals of the comparator array 37 are connected to a gate array 39 constructed of M NAND gates 39A to 39M each inputted with an output signal from each comparator and a strobe signal from the strobe signal generator 30. The NAND gate outputs a low level "L" signal when it receives the strobe signal of a low level "L" while receiving the drive signal of a low level "L" from each comparator.

The gate array 39 is connected to a thermal element array 40 constructed of the M thermal elements 19A to 19M linearly disposed in the main scan direction. Each thermal element 19A to 19M is being powered while a corresponding one of the NAND gates 39A to 39M outputs an "L" signal as a drive pulse. Thereby, the back of the ink film 28 and the ink is transferred to the recording sheet 25.

Figure 4:
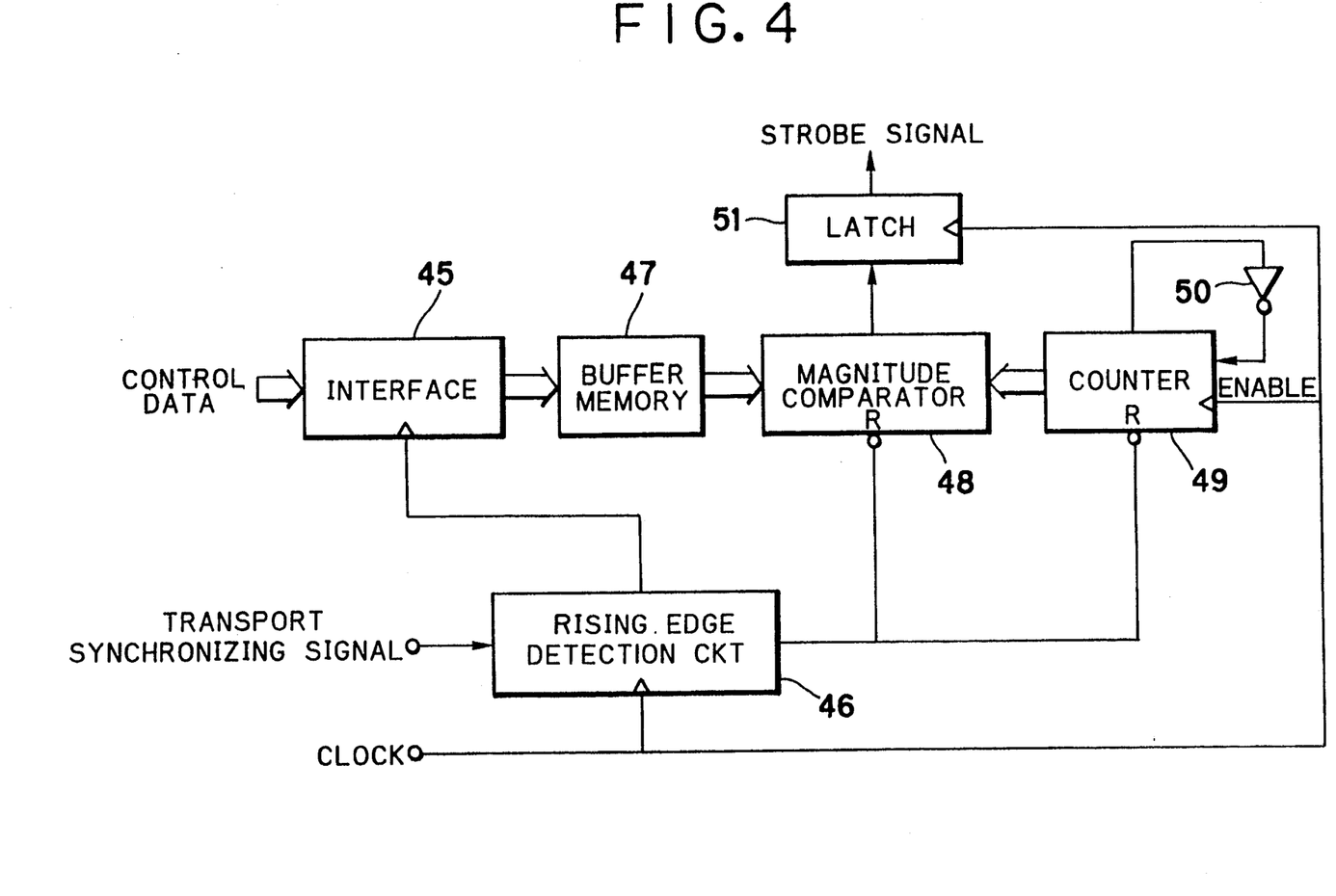
FIG. 4 is a block diagram showing an example of a strobe signal generator shown in FIG. 1.

FIG. 4 shows an example of the strobe signal generator 30. The system controller 21 outputs 8-bit control data to the strobe signal generator 30. Each control data represents a time period during which the thermal elements can be powered. The control data, namely the time period, is determined according to the pixel position in the sub scan direction and the sub-line position within the pixel.

An interface 45 writes the control data in a buffer memory 47 when a rising edge detection circuit 46 detects a rising edge of the transport synchronizing signal. The rising edge detection circuit 46 resets a magnitude comparator 48 and a counter 49 upon detecting the rising edge. The counter 49 counts the clocks to output a hexadecimal count value, and outputs a carry signal when the counter 49 counts up to a maximum value of the control data. The carry signal is inverted by an inverter 50. As a result, a signal inputted in a count enable input of the counter 49 is inverted, so that the counter 49 stops counting.

Figure 5:
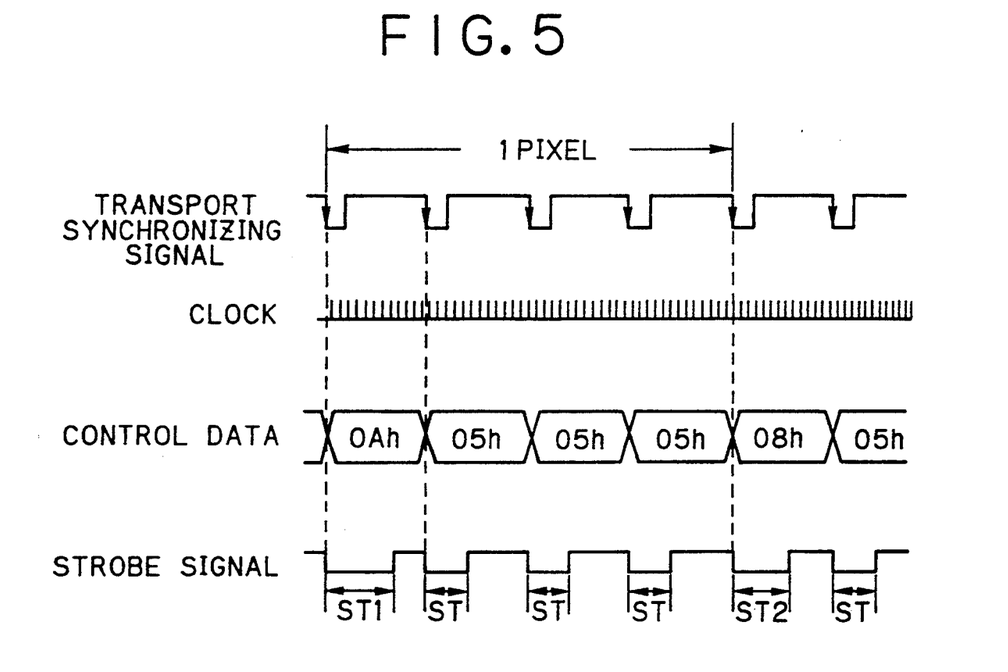
FIG. 5 is a timing chart showing an embodiment of the operation of a strobe signal generator of FIG. 4.

As will be described in more detail with reference to FIGS. 5 and 6, the output of the magnitude comparator 48 is inverted from an "L" level to an "H" level when the count of the counter 49 becomes more than the control data read from the buffer memory 47. The output of the magnitude comparator 48 is latched by a latch circuit 51 in synchronism with the clocks. The latched signal is sent to the recording head driver 18, as a strobe pulse.

The operation of this embodiment will be described with reference to FIGS. 1 to 6.

In scanning an image, a scanner, video reproducing apparatus, or the like is connected to the input terminal 10 to input analog image data to the A/D converter 11. Digital image data converted by the A/D converter 11 is written in the frame memory 14.

In printing image data, the system controller 21 actuates the motor driver 22 to drive the pulse motor 23 and stepwise rotates the platen drum 24 holding a recording sheet 25. Rotation of the platen drum 24 is detected by the rotary encoder 29 to send the encoder pulses to the timing signal generator 12 and the transport synchronizing signal generator 20. According to the encoder pulses, the timing signal generator 12 generates the timing signals and sends the same to the system controller 21. Using the timing signals as a reference, the system controller 21 sequentially controls circuit elements of the printer while giving synchronous operations between the elements. In accordance with the clocks from the timing signal generator 12 and the encoder pulses, the transport synchronizing signal generator 20 generates one transport synchronizing signal each time the platen drum 24 rotates by one sub-line amount, and sends this signal to the recording head driver 18.

Immediately before the recording sheet 25 reaches the printing start position, the system controller 21 starts an operation of reading M pixel image data in the main scan direction from the frame memory 14. The M image data are sequentially subjected to half-tone correction by the half-tone controller 15, and sent to the shift register 35 of the recording head driver 18. The shift register 35 shifts and latches the M image data in response to the clocks from the timing signal generator 12.

The M image data set in the shift register 35 are latched in the latch array 36 in response to the latch signal from the system controller 21. The M image data are sent from the latch array 36 to the comparator array 37 to be compared with the count of the hexadecimal counter 38. When the recording sheet 25 reaches the recording start position or the first sub-line of pixels, the system controller 21 sends the reset signal to the counter 38, to reset the counter 38 to "01h".

On the other hand, the system controller 21 outputs the control data for controlling the powering time period of the thermal elements 19A to 19M according to the pixel position in the sub scan direction and the sub-line position. In the embodiment shown in FIG. 5, for instance, because the recording head 19 is cool prior to recording the first sub-line of each pixel constituting the first line that extends in the main scan direction, control data having a large numerical value, for example "0Ah" is given to the thermal elements 19A to 19M, for recording the first sub-line of the first line.

When recording the pixels of the second line, because the recording head 19 accumulates an amount of heat energy, relatively small control data "08h" is given for the first sub-line of the second line pixels, taking the accumulated heat energy into consideration. It is to be noted that the control data given for the second to fourth sub-lines of each pixel takes a constant value "05h" in this embodiment.

Accordingly, as for the first sub-line of the first line pixels, the output of the magnitude comparator 48 maintains the "L" level until the counter 49 has counted eleven clocks after reset. The "L" signal is latched in the latch circuit 51 synchronously with the clock, and the latched signal is sent to the gate array 39, as a strobe signal ST1. For the first sub-line of the second line pixels, the magnitude comparator 48 outputs a strobe signal ST2 while the counter 49 counts nine clocks. For each of the second to fourth sub-lines of each pixel, a strobe signal ST that corresponds to six clocks is generated.

In case of an embodiment shown in FIG. 2, because the latch circuit 36A latches an image data "04h", the 8-bit magnitude comparator 37A outputs an "H" level signal. When the strobe signal ST1 is output from the strobe signal generator 30 to the gate array 39, the output of the NAND gate 39A takes an "L" level. Because a voltage Vp is applied to the thermal element 19A, a drive pulse GP1 flows through the thermal element 19A while the output of the NAND gate 39A is at an "L" level. Since the width of the drive pulse GP1 is the longest corresponding to the width of the strobe pulse ST1, the thermal element 19A is heated up to a predetermined recording temperature rapidly compared with a case where intermittent pulses are applied for jack up heating. When the temperature of the ink film 28 goes beyond a melting point of the ink, the melted ink is transferred to the recording paper 25, so that a rectangular ink dot is recorded on the first sub-line 55a of the first pixel 55 of the first line, as shown by the hatched area in FIG. 2. It is to be noted that because there is a delay in response of the thermal elements to the drive pulses, the time chart of FIG. 2 shows the delay as the shift of temperature curve relative to the drive pulses.

After the thermal elements 19A to 19M record the first sub-lines of the first line pixels, the platen drum 24 further rotates by one sub-line amount in the sub scan direction. At this time, the thermal element 19A faces on the second sub-line 55b, and the count of the counter 38 is incremented by the transport synchronizing signal to take a value "02h". In this case, the count of the counter 38 is still less than the image data, and the output signal of the 8-bit magnitude comparator 37A maintains the "L" level, so that the NAND gate 39A outputs a drive pulse P to the thermal element 19A when the second strobe signal ST is inputted thereto, recording ink on the second sub-line 55b of the pixel 55. In the same way as to the second sub-line, the thermal element 19A is powered further twice by two drive pulses P, so as to record the third and fourth sub-lines 55c and 55d of the pixel 55. In this way, all the sub-lines 55a to 55d of the pixel 55 of the fist line are recorded with ink.

Figure 6:
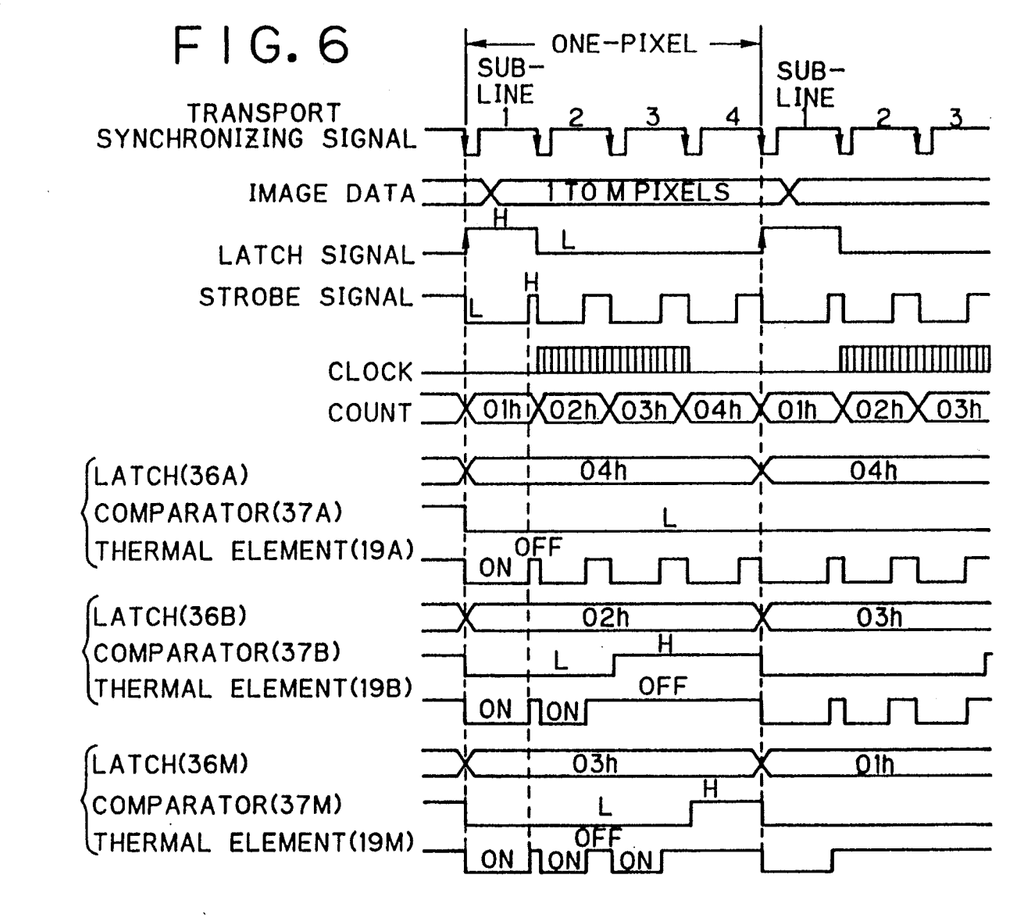
FIG. 6 is a timing chart for explaining the operation of the recording head driver shown in FIG. 3.

Because the latch circuit 36B latches an image data "02h" in the embodiment shown in FIG. 6, the thermal element 19B records a dot on the first and second sub-lines of the second pixel of the first line, wherein the powering time period of the thermal element 19B is controlled also by the strobe pulses ST1 and ST.

After recording M pixels of the first line, recording of the second line is started. The strobe pulse ST2 is applied to the gate array 39 for recording the first sub-line of the second line. Because the strobe pulse ST2 is set longer than the constant strobe pulses ST but shorter than the strobe pulse ST1, taking the heat energy accumulated in the recording head 19, the drive pulse GP2 heats the thermal element 19A rapidly compared with the conventional intermittent booster pulses. However the temperature of the thermal element 19A will not go beyond that achieved by the drive pulse GP1. Rather, the drive pulse GP2 heats the thermal element 19A up to the approximately the same temperature as does the drive pulse GP1. The thermal element 19A is driven by the constant drive pulses P for recording the second to fourth sub-lines of the first pixel 56 of the second line.

For recording the first sub-line of the first pixel 57 of the third line, the thermal element is driven by a drive pulse GP3, whereas a drive pulse GP4 is used for recording the first sub-line of the first pixel 58 of the fourth line. In this way, the heat energy accumulated in the recording head 19 is taken into consideration when determining the width of drive pulses for recording the first sub-lines of the individual pixels, so as to maintain the temperature of the thermal elements 19A to 19M substantially constant on recording of each sub-line. Therefore, the shading effect that causes unevenness of the recording density by the ink is prevented.

Figure 7:
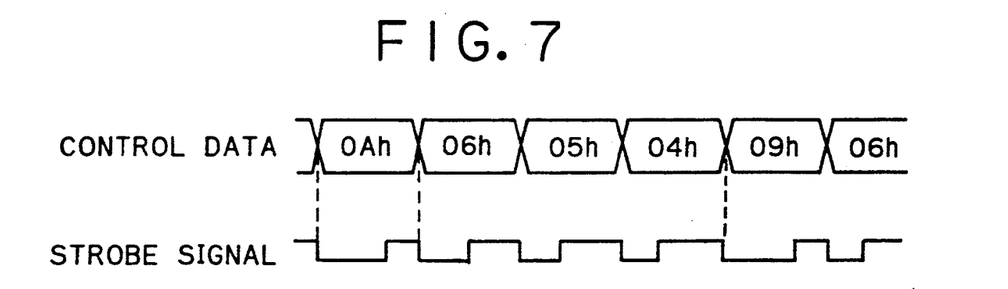
FIG. 7 is a timing chart showing another embodiment of the operation of the recording head driver.

Although the above-described embodiment controls only the width of the drive pulse for the first sub-line, it is preferable to control drive pulses for the second to fourth sub-lines, by taking the drive pulse that is preceding applied to the same thermal element into consideration. FIG. 7 shows an example embodying this theory, wherein control data for determining the width of each strobe signal is changed according to the pixel position and the sub-line position within each pixel.

In the above embodiments, monochrome printing has been given for simplicity of the description. The present invention however is applicable to color printing. In printing a color image, a decoder is provided between the input terminal 10 and A/D converter 11 to separate three color signals from a color video signal. Each color signal is converted into a color digital signal and written in the frame memory 14 provided for each color. In printing a color image, each color image data is read from the frame memory 14 to perform three color frame-sequential recording while rotating the platen drum 24 three times. In color printing, a color ink film is used having cyan ink areas, magenta ink areas, and yellow ink areas cyclically formed.

Furthermore, although a line printer incorporating one-dimensional relative motion between a recording sheet and an ink film has been described, the present invention is also applicable to a serial printer incorporating two-dimensional relative motion. With such a serial printer, a movable recording head is used and a plurality of thermal elements are linearly disposed in the direction of feeding a recording sheet. Therefore, with a serial printer, the direction of feeding a recording sheet and the direction of disposing thermal elements are in the main scan direction, and the direction of moving a recording head is in the sub scan direction.

The present invention is also applicable to other printers for printing a half-tone image by an area gradation method, such as sublimation transfer type thermal printers, and direct imaging type thermal printers. Still further, it is possible to control heat energy considering the coloring property of each color ink, or the like, so as to compensate the difference in the property of each color.

Various changes and modifications to the illustrative embodiments described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. In a thermal recording method for recording a half-tone image on a recording medium by using a thermal head having a plurality of heating elements aligned in a first direction comprising the steps of:
   (a) arranging a plurality of pixels in a matrix which constitute the half-tone image, each of said pixels including a first to a first predetermined number of sub-lines aligned in a second direction orthogonal to said first direction where said first predetermined number is an integer;
   (b) positioning each of the plurality of heating elements to seriatim face said first to said first predetermined number of sub-lines of corresponding ones of said pixels in order to form said first of said sub-lines;
   (c) moving the thermal head and the recording medium in said second direction relative to each other by a constant amount corresponding to one sub-line;
   (d) supplying a first to a second predetermined number of drive pulses to one of the heating elements to heat said one of the heating elements and record said first to said second predetermined number of said sub-lines for one of said pixels where said second predetermined number is an integer less than or equal to said first predetermined number and one of said second predetermined number of said drive pulses is supplied each time said one of the heating elements faces one of said first to said second predetermined number of said sub-lines;
   (e) changing said second predetermined number depending on a desired tonal step for said one of said pixels wherein said first of said drive pulses has a width wider than widths of said drive pulses other than said first of said drive pulses so as to heat said one of the heating elements up to a predetermined temperature; and
   (f) changing said width for said first of said drive pulses relative to a standard value based on thermal conditions of the heating elements for heating the heating elements up to said predetermined temperature so that an equal size of ink is recorded on said first of said sub-lines of each of said pixels which is to be recorded with ink.

2. A thermal recording method as recited in claim 1, wherein said width of said first of said drive pulses is changed at said step (f) according to a position of each of said pixels in said first direction.

3. A thermal recording method as recited in claim 2, wherein said width of said first of said drive pulses is the longest at a beginning of recording said plurality of pixels, and becomes shorter as the recording proceeds.

4. A thermal recording method as recited in claim 3, wherein said width of said first of said drive pulses is set longer than said second predetermined number of drive pulses other than said first of said drive pulses for recording of said second predetermined number of sub-lines other than said first of said sub-lines for each of said plurality of pixels.

5. A thermal recording method as recited in claim 4, wherein said second predetermined number of drive pulses other said first of said drive pulses have a constant width.

6. A thermal recording method as recited in claim 4, wherein widths of said second predetermined number of drive pulses other than said first of said drive pulses are changed according to positions of said second predetermined number of sub-lines other than said first of said sub-lines within each of said plurality of pixels.

7. A thermal recording method as recited in claim 6, wherein said steps (d) to (f) include the steps of:
outputting an image signal for designating said second predetermined number to each of said plurality of pixels;
outputting a strobe signal for controlling a powering time period of said heating element according to positions of said sub-lines and positions of said plurality of pixels in the first direction; and
generating said first to said second predetermined number of drive pulses based on said image signal and said strobe signal, widths of said drive pulses being changed corresponding to said strobe signal.

8. In a thermal recording method for recording a half-tone image on a recording medium by using a thermal head having a plurality of heating elements aligned in a first direction comprising the steps of:
(a) arranging a plurality of pixels in a matrix which constitute the half-tone image, each of said pixels including a first to a first predetermined number of sub-lines aligned in a second direction orthogonal to said first direction where said first predetermined number is an integer;
(b) positioning each of the plurality of heating elements to seriatim face said first to said first predetermined number of said sub-lines of corresponding ones of said pixels in order to form said first of said sub-lines;
(c) moving the thermal head and the recording medium in said second direction relative to each other by a constant amount corresponding to one sub-line;
(d) supplying a first to a second predetermined number of drive pulses to one of the heating elements to heat said one of the heating elements and second said first to said second predetermined number of sub-lines for one of said pixels where said second predetermined number is an integer less than or equal to said first predetermined number and one of said second predetermined number of said drive pulses is supplied each time said one of the heating elements faces one of said first to said second predetermined number of said sub-lines;
(e) changing said second predetermined number depending on a desired tonal step for said one of said pixels wherein said first of said drive pulses has a width wider than widths of said drive pulses other than said first of said drive pulses so as to heat said one of the heating elements up to a predetermined temperature;
(f) changing said width for said first of said drive pulses relative to a standard value based on thermal conditions of the heating elements for heating the heating elements up to said predetermined temperature so that an equal size of ink is recorded on said first of said sub-lines of each of said pixels which is to be recorded with ink; and
(g) changing widths of a second to said second predetermined number of said drive pulses relative to a second standard value in accordance with positions of a second to said second predetermined number of sub-lines in each of said pixels so as to have an equal size of ink recorded on each of said second to said second predetermined number of said sub-lines.

9. A thermal recording method as recited in claim 8, wherein said width of said first of said drive pulses is the longest for said first of said sub-lines for each of said pixels, and said widths of said drive pulses other than said first of said drive pulses become shorter for each subsequent sub-line of said first predetermined number of sub-lines within each of said pixels.

10. In a thermal recording device for recording a half-tone image on a recording medium comprising:
a thermal head having a plurality of heating elements aligned in a first direction for recording the half-tone image on the recording medium;
pixel arranging means for arranging a plurality of pixels in a matrix which constitute the half-tone image, each of said pixels including a first to a first predetermined number of sub-lines aligned in a second direction orthogonal to said first direction where said first predetermined number is an integer;
heating element positioning means for positioning each of said plurality of heating elements to seriatim face said first to said first predetermined number of said sub-lines corresponding to ones of said pixels in order to form said first of said sub-lines;
thermal head moving means for moving said thermal head and the recording medium in said second direction relative to each other by a constant amount corresponding to one sub-line;
drive pulse supplying means for supplying a first to a second predetermined number of drive pulses to one of said heating elements to heat said one of said heating elements and record said first to said second predetermined number of sub-lines for one of said pixels where said second predetermined number is an integer less than or equal to said first predetermined number and one of said second predetermined number of said drive pulses is supplied each time said one of said heating elements faces one of said first to said second predetermined number of said sub-lines;
tonal step changing means for changing said second predetermined number depending on a desired tonal step for said one of said pixels wherein said first of said drive pulses has a width wider than widths of said drive pulses other than said first of said drive pulses so as to heat said one of said heating elements up to a predetermined temperature; and
first drive pulse changing means for changing said width for said first of said drive pulses relative to a standard value based on thermal conditions of said heating elements for heating said heating elements up to said predetermined temperature so that an equal size of ink is recorded on said first of said sub-lines of each of said pixels which is to be recorded with ink.

11. In a thermal recording device as recited in claim 10, further comprising pulse generating means for generating a transport synchronizing pulse signal each time the recording medium or said thermal head moves by one sub-line amount in said first direction, and a first counter for counting said transport synchronizing pulse signal, said first counter being reset one time for each of said pixels.

12. In a thermal recording device as recited in claim 11, further comprising a magnitude comparator for comparing a count of said first counter with image data representative of a size of a dot to be recorded in each of said pixels, and generating a drive signal which designates one of said sub-lines to be recorded within each of said pixels until said count of said first counter becomes more than said image data.

13. In a thermal recording device as recited in claim 12, further comprising:
    first signal outputting means for outputting a first signal each time a rising edge of said transport synchronizing pulse signal is detected;
    control data generating means for generating control data for each of said sub-lines in accordance with positions of each of said pixels and positions of each of said sub-lines in response to said first signal;
    a second counter for counting a clock signal until a count of said second counter reaches a predetermined maximum value of said control data, said second counter being reset by said first signal; and
    a second magnitude comparator for comparing said count of said second counter with said control data, in order to generate a strobe signal until said count of said second counter becomes more than said control data, said second magnitude comparator being reset by said first signal.

14. In a thermal recording device as recited in claim 13, further comprising a gate which outputs said drive pulses when said gate receives said strobe signal while receiving said drive signal, said thermal head being connected to an output of said gate.

15. In a thermal recording device as recited in claim 14, wherein said thermal head moving means includes a platen drum for holding the recording medium, and a motor for rotating said platen drum to transport the recording medium in said first direction.

16. In a thermal recording device as recited in claim 15, wherein the thermal recording device comprises a thermal wax transfer type printer wherein each of said heating elements heats a back surface of an ink film to transfer ink onto the recording medium.

17. In a thermal recording device for recording a half-tone image on a recording medium comprising:
    a thermal head having a plurality of heating elements aligned in a first direction for recording the half-tone image on the recording medium;
    pixel arranging means for arranging a plurality of pixels in a matrix which constitute the half-tone image, each of said pixels including a first to a first predetermined number of sub-lines aligned in a second direction orthogonal to said first direction where said first predetermined number is an integer;
    heating element positioning means for positioning each of said plurality of heating elements to seriatim face said first to said first predetermined number of said sub-lines corresponding to ones of said pixels in order to form said first of said sub-lines;
    thermal head moving means for moving said thermal head and the recording medium in said second direction relative to each other by a constant amount corresponding to one sub-line;
    drive pulse supplying means for supplying a first to a second predetermined number of drive pulses to one of said heating elements to heat said one of said heating elements and record said first to said second predetermined number of sub-lines for one of said pixels where said second predetermined number is an integer less than or equal to said first predetermined number and one of said second predetermined number of said drive pulses is supplied each time said one of said heating elements faces one of said first to said second predetermined number of said sub-lines;
    tonal step changing means for changing said second predetermined number depending on a desired tonal step for said one of said pixels wherein said first of said drive pulses has a width wider than widths of said drive pulses other than said first of said drive pulses so as to heat said one of said heating elements up to a predetermined temperature;
    first drive pulse changing means for changing said width for said first of said drive pulses relative to a first standard value based on thermal conditions of said heating elements for heating said heating elements up to said predetermined temperature so that an equal size of ink is recorded on said first of said sub-lines of each of said pixels which is to be recorded with ink; and
    second drive pulse changing means for changing widths of a second to said second predetermined number of said drive pulses relative to a second standard value in accordance with positions of a second to said second predetermined number of said sub-lines in each of said pixels so as to have an equal size of ink recorded on each of said second to said second predetermined number of said sub-lines.

18. In a thermal recording device as recited in claim 17, wherein said thermal head moving means includes a platen drum for holding the recording medium, and a motor for rotating said platen drum to transport the recording medium in said first direction.

19. In a thermal recording device as recited in claim 18, wherein the thermal recording device comprises a thermal wax transfer type printer wherein each of said heating elements heats a back surface of an ink film to transfer ink onto the recording medium.

* * * * *